(No Model.)

J. HOWARD.
NUT LOCK.

No. 433,128.  Patented July 29, 1890.

Witnesses
Francis M. Brithits
J. Alfred Anderson

Inventor
Joseph Howard

UNITED STATES PATENT OFFICE.

JOSEPHUS HOWARD, OF BOSTON, MASSACHUSETTS.

NUT-LOCK.

SPECIFICATION forming part of Letters Patent No. 433,128, dated July 29, 1890.

Application filed May 10, 1890. Serial No. 351,311. (No model.)

*To all whom it may concern:*

Be it known that I, JOSEPHUS HOWARD, a subject of the Queen of Great Britain, residing at Boston, in the county of Suffolk and State of Massachusetts, have invented a new and useful Improvement in Nut-Locks, which I will describe as follows, reference being had to the accompanying drawings, which form a part of this specification, like letters indicate like parts in the different figures thereof.

Figure 2:
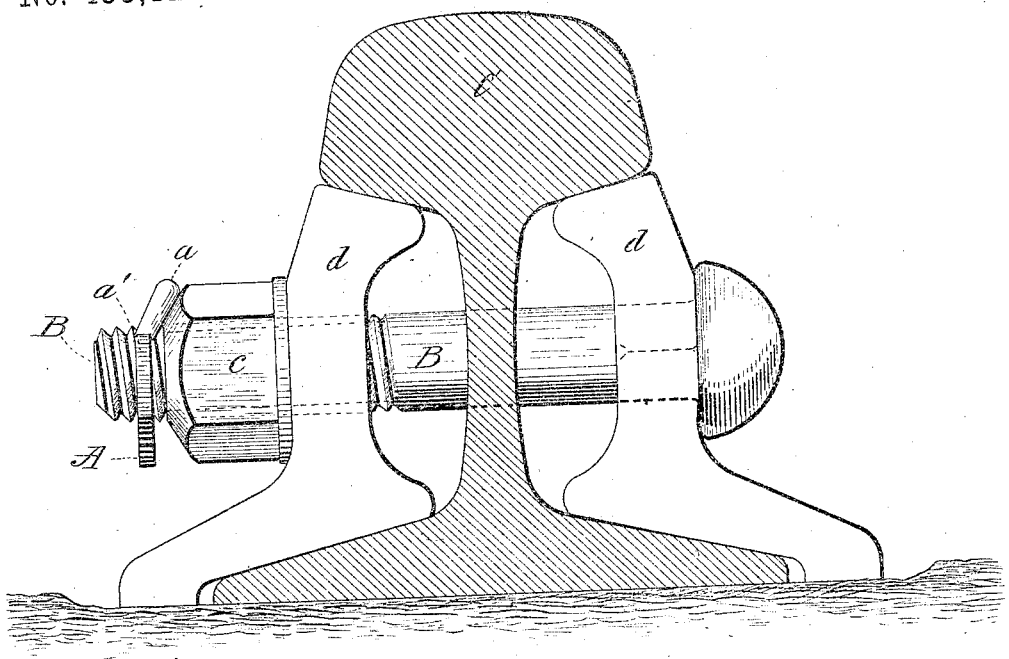
Figure 1:
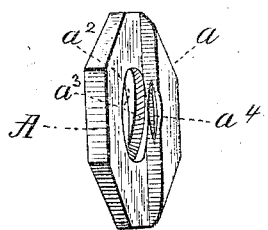
Figure 4:
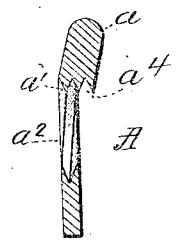
Figure 3:
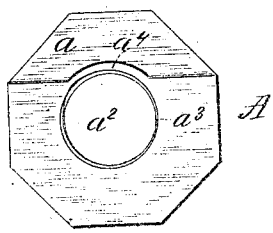

Figure 1 of the drawings shows in perspective my nut lock or washer. Fig. 2 is a transverse section, and illustrates the application of the invention upon a railroad-track bolt. Fig. 3 is a plan showing the inside face of the nut-lock, and Fig. 4 is a vertical central section of the nut-lock.

My invention is especially applicable to railroad-track bolts, but may be used, of course, with any other bolts or nuts where practicable.

The invention consists in a nut-lock, in the general form of a washer, bent to secure the necessary leverage upon the nut and made thicker upon the inside face of the bent side of the washer, so that when the nut tries to work off, its bearing upon said thick side of the nut-lock crowds the opposite side of the said lock into the thread of the bolt, and thus holds the nut tighter than ever, the said lock holding upon both sides.

In the drawings, A represents the nut-lock, and $a$ the thicker part, above referred to. This thick part should be, preferably, all one piece with the washer. It is better that the washer be eight-sided, as shown in the drawings, and it should be made of steel or of some material harder than that of which the nut and bolt are made, so that the attempted working off of the nut will not wear the lock. The one thread $a^3$ in the opening $a^2$ is of importance in turning the washer A on and off of the bolt B, and the additional thread and groove in the thick part $a$ designated $a^4$ set the lock thoroughly when it has been set up by the use of a wrench. The bend in the washer above referred to is designated $a'$ in the drawings.

It is perhaps not necessary to state in explanation of Fig. 2 that C represents a railroad-rail; $d$ $d$ are the fish-plates; B, the track-bolt, and $c$ the nut upon the track-bolt.

What I claim as new, and desire to secure by Letters Patent, is—

1. A nut-lock bent upon one side and made thicker on the inside face of said bent side, said nut-lock being provided with one thread extending completely round within the opening in the center of said lock or washer, and also provided with one additional thread and groove in said thicker side, constructed and arranged substantially as described and shown, and for the purpose set forth.

2. The nut lock or washer A, bent as shown at $a'$, and made thicker at $a$, said washer being provided with the thread $a^3$ in the opening $a^2$, and also provided with the additional thread and groove $a^4$, in combination with the bolt B and nut $c$, the whole constructed and arranged substantially as described and shown, and for the purpose set forth.

JOSEPHUS HOWARD.

Witnesses:
FRANCIS M. BOUTWELL,
J. ALFRED ANDERSON.